Jan. 11, 1927.
H. S. ASHENHURST
1,613,639
METHOD OF MAKING CELLULAR BLOCKS
Original Filed Sept. 10, 1924
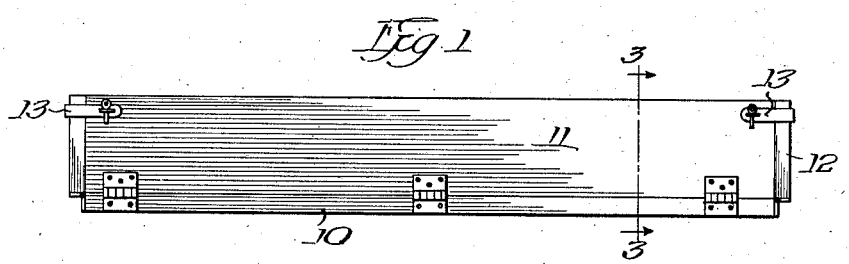
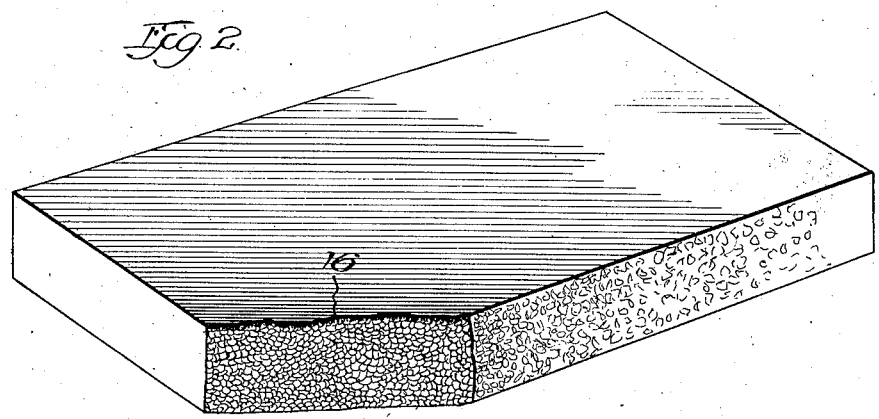
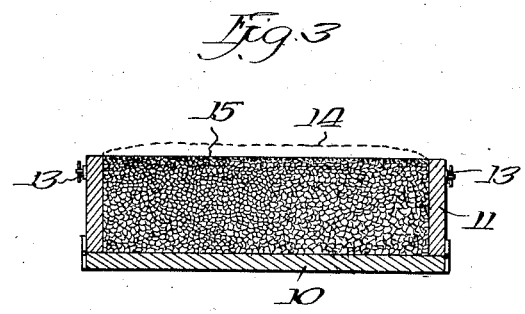

Patented Jan. 11, 1927.

1,613,639

UNITED STATES PATENT OFFICE.

HAROLD S. ASHENHURST, OF CHICAGO, ILLINOIS, ASSIGNOR, BY MESNE ASSIGNMENTS, TO INSULEX CORPORATION, OF CHICAGO, ILLINOIS, A CORPORATION OF DELAWARE.

METHOD OF MAKING CELLULAR BLOCKS.

Original application filed September 10, 1924, Serial No. 736,892. Divided and this application filed March 3, 1925. Serial No. 12,883.

This application is a division of my co-pending application, Serial Number 736,892, filed September 10, 1924, in which application I have claimed the block produced by the method herein disclosed and claimed.

One of the objects of my invention is to provide a building block that is light in weight, that will be relatively non-absorbent, and that will have a dense, hard skin on its top surface. The block is composed of materials that will react in the presence of water to evolve a gas and to provide means for retaining the gas in bubble form until the mass sets and hardens in expanded condition so as to be of a cellular character throughout and correspondingly light in weight.

It is one of the objects of my invention to provide a maximum of body strength in the block even though it is light and of cellular form, the production of such strength depending in part on the development of the surface density. This dense skin is produced by breaking down the light and fragile cells at the top surface of the block and forming from such cellular material so broken down a thin layer of non-cellular gypsum. This surface sets very quickly and provides a relatively hard and resistant skin within a few minutes after the block is cast. The same result may be secured by applying a thin coat of non-cellular gypsum by any other suitable method to the surface after the rising and expansion of the mass are complete. The remaining sides of the block are relatively weak, being of cellular formation with many of the cells open at the surface. Such side and bottom surfaces are not so weak, however, as the top surface would be normally, since the hydrostatic pressure has resulted in the formation of cells having stronger and thicker walls than those at the top where no such pressure exists. The formation of a block of cellular material of the type described and having one or more face portions with open cell formation is not claimed in this application but forms a part of the subject-matter disclosed and claimed by my co-pending application Serial No. 730,720, filed August 7, 1924.

The block and the method of constructing it will be better understood by reference to the accompanying drawings, in which:—

Fig. 1 is a perspective view of a mold within which the block may be formed.

Fig. 2 is a perspective view of the block, and

Fig. 3 is a transverse sectional view through the mold and contained block.

In the drawings, I have illustrated a form of mold comprising a bottom 10, and side walls 11, 12, which may be hinged to the bottom if desired. Means such as the clasp 13, may be employed to temporarily secure the mold sides in the position shown.

After the mold has been prepared as shown, I pour therein a mass of plastic material composed of gypsum as the major ingredient, in combination with water and certain chemicals such as disclosed in my Reissue Patent No. 15,952, of November 25, 1924. Following the addition of the water, a gas is evolved thus causing the mass to expand or rise. Assuming that a correct quantity of the cementitious material has been placed in the mold, it will rise above the sides as indicated in dotted lines at 14, in Fig. 3. As soon as the full expansion has taken place and before the material has set, the top is levelled either by screeding or troweling to produce the flat plane surface 15. The operation of levelling results in the formation of a dense relatively hard outer surface or skin composed of non-cellular gypsum. This is indicated at 16, in Fig. 2. The body of the block is cellular throughout and many of the cells are exposed on the sides and bottom of the block. This provides an ideal plaster surface.

After the block has been levelled and the material has become rigid, the sides of the mold are separated and the block removed. It may be immediately placed in position in a wall, or allowed to dry and be handled and shipped without danger of breaking.

While I have described my invention as an improved method of producing a block, I wish to have it understood that I do not desire to limit my invention to small blocks adapted to be handled for fabricating a floor, roof, or vertical wall therefrom as distinguished from a large block comprising by itself a complete floor or roof cast in place in a mold permanently or temporarily provided along the sides of a roof or floor and comprising perhaps the deck of the floor or roof and perhaps portions of the walls of the building.

Neither do I wish to be restricted to any particular form or proportions of ingredients in the materials used, except as the same may be specifically claimed. I have had very good results by the use of a mixture of the following form,—100 pounds of calcined gypsum, 2 ounces of commercial retarder, 3¾ pounds of a suitable carbonate such as calcium carbonate, and 8 pounds of aluminum sulphate containing its water of crystallization, all of such ingredients being finely ground and thoroughly mixed in a dry state.

In the mixing of the material, care will be exercised to avoid the use of an excess of water, only sufficient water being added to make a mix that is readily stirred and handled. The block will, therefore, have no unusual affinity for water and the water of the plaster will not be absorbed.

I claim:

1. The method of forming insulating blocks which consists in casting a plastic mass that will expand and set, allowing the mass to rise, and then dressing down the top surface of the block by a series of scraping and smoothing operations serving to break down the expanded formation at the surface and serving thereby to provide a relatively dense and tough skin.

2. The method of preparing insulating blocks of gypsum as the major ingredient, consisting in providing an open-top mold, then casting therein a quantity of the material in plastic form, then permitting the mass to expand, then breaking down the cells on the top surface of the expanded material to provide a relatively smooth, dense and tough skin.

3. The method of forming cellular blocks of insulating material, consisting in providing a mold, casting therein a quantity of gypsum together with chemicals that, in the presence of water, will react and cause the mass to expand and set in a cellular condition, then allowing the mass to expand, and then before the setting and hardening are complete dressing down the top surface of the material by a scraping and smoothing operation serving to break down the cellular formation at the surface to provide a dense skin.

4. The method of forming insulating blocks which consists in providing a mold, then casting therein a plastic mass that will expand and set, allowing the mass to rise above the top of the mold, and then breaking down the cells contained in the material that projects above the mold top and thereby levelling the top and providing a dense, tough, non-cellular top surface.

Signed at Chicago, Illinois, this 27th day of February, A. D. 1925.

HAROLD S. ASHENHURST.